United States Patent Office 2,894,929
Patented July 14, 1959

2,894,929

RUBBERY COMPOSITIONS REINFORCED WITH SOLID, SUBSTANTIALLY FIBROUS SILICON DIOXIDE

Edwin B. Newton, Akron, Ohio, and Daniel S. Sears, Henrico County, Va., assignors to The B. F. Goodrich Company, New York, N.Y., a corporation of New York No Drawing. Application May 28, 1954
Serial No. 433,289

6 Claims. (Cl. 260—41.5)

The present invention relates to rubbery compositions containing reinforcing pigments. In particular, this invention relates to rubbery materials reinforced with white, particulate, oxidized, condensation products of silicon monoxide.

Rubbery compositions have contained for many years reinforcing pigments to improve their tensile strength, elongation and modulus. It is not fully understood how these reinforcing pigments function in the rubbery mass during vulcanization to improve its properties but the results obtained are believed to be due to physical or chemical phenomena or a combination of both.

Carbon black is generally employed in rubbery compositions as the reinforcing pigment to provide these properties because it has been in the past the most satisfactory reinforcing pigment known. However, carbon black cannot be employed to make light colored and white rubbery goods as the white pigments used will not mask the carbon black. If a gray colored product is desired, so much white pigment is used as compared to the carbon black that the reinforcing properties of the carbon black are very materially lost. On the other hand, if the carbon black is omitted entirely, the vulcanized article is not considered as being reinforced. An example of the use of white rubber is in a tire white sidewall which is an overlay on the carcass but which cannot be used as a tread since the rubber does not contain a reinforcing pigment such as carbon black. A further disadvantage with the employment of carbon black is that its cost is gradually increasing while the available sources of raw materials for producing carbon black are rapidly being depleted. Accordingly, from both an economic and technical standpoint, the employment of carbon black as a reinforcing pigment leaves much to be desired.

Inorganic pigments such as calcium silicate and the like have been proposed in the past as reinforcing pigments. However, their use has been mainly as a filler because they do not impart sufficient strength to rubbery compositions to replace the reinforcing blacks.

Silica is another material which is in great abundance, and therefore, might afford, if properly prepared, a means for producing light colored reinforced rubbery materials. However, its particle size as quartz or sand is too large. On the other hand, arc and fume silica have a very small particle size and have the same index of refraction as rubber so that when mixed therewith white to light or translucent rubbery goods are obtained. However, they are not equivalent to the carbon blacks.

Condensed silicon monoxide does have reinforcing properties in rubbery materials but, unfortunately, it will not in its original state of preparation provide white rubbery goods. This condensed silicon monoxide is really a disproportionation product of silicon and silicon dioxide having the now generally recognized formula,

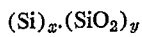

$$(Si)_x \cdot (SiO_2)_y$$

where $x$ and $y$ are integers, and is made in a manner similar to that of arc silica except that the silicon-monoxide gas produced during the reaction of silica and coke at high temperatures is introduced rapidly into an evacuated chamber and rapidly cooled or condensed. This product called "monox" is described by Potter in U.S. Patents Nos. 875,286, 875,675 and 1,104,384, and in "Transactions of The American Electrochemical Society," vol. XII, 1907, pages 191–228. It also is described in the U.S. patent to Tone, 993,913. When viewed under the electron microscope, the silicon monoxide made by Potter appears to comprise a mixture of a major amount of fibrous particles in which the fibers have an average length of about 50 to 600 millimicrons in which the ratio of width to length is about 1:10 to 1:50 and a surface area of about 60 to 200 square meters per gram and a minor amount of spherical or horn-like particles which can be as small as about 5 millimicrons average up to about 200 millimicrons average particle size. These smaller particles may have a surface area up to about 300 m.²/g. Silicon monoxide having a high proportion of fibers can also be made continuously by condensing silicon-monoxide vapor with an essentially pure inert condensing gas under nonturbulent conditions as disclosed in copending application of Daniel S. Sears, Serial No. 433,020, entitled "Method of Making Pigment" and filed of even date. Fibrous, nitrogen-containing silicon monoxide can also be produced by condensing the silicon-monoxide vapor in an inert gas containing a minor amount of an amine-containing gas as shown in copending application Serial No. 433,099, of Daniel S. Sears, entitled "Pigment and Process of Making the Same" filed of even date. Both the Potter "monox" and the "monox" of the above applications are brown in color and are useful for certain applications such as belts and mechanical goods but are not too useful for white reinforced rubbery goods in view of the brown color. While large amounts of $TiO_2$ and other white pigments may offset the color, the physical characteristics of the resulting vulcanized rubber materials are poor.

It will be noted that Potter in his U.S. Patents Nos. 875,674, 886,637 and 908,131 suggests that an oxidized product may be made by blowing silicon monoxide and air in a highly heated tube, through an oxidizing flame or by ignition. Although particles of the "monox" treated in such a manner appear white on their surface, they are apparently not changed in color in their interior, for when introduced into benzene, the mixture immediately becomes brown in color. Moreover, when used in rubbery compositions, this so-called white product will produce brown rather than white rubbery compositions and thus is not desirable for white rubber goods. Apparently these methods of rapid oxidation result in sintering which causes a loss of structure of the particles or oxidation only on the surface of the silicon-monoxide particle since the resulting product colors the rubber brown without reinforcing it. Moreover, it is not possible to blow "monox" through a tube since it tends to stick to the sides of the tube and clog it up, apparently due to static electricity. When oxidized in a calorimeter, the "monox" forms large globules or clumps so that its particulate structure is lost and it loses its property of reinforcing rubbery materials. Apparently the methods disclosed resulted in oxidizing only the surface of the monoxide or caused agglomerates to form.

An object of this invention is to provide a method for producing a rubbery composition reinforced with a light colored or white finely-divided reinforcing pigment from silicon monoxide.

A still further object of this invention is to provide compositions of matter containing a vulcanizable rubbery material and, a light colored or white, finely-divided reinforcing pigment from silicon monoxide.

These and other objects and advangtages of the present invention will become more apparent to those skilled in the art from the following detailed description and examples.

It has now been found according to the present invention that, by slowly heating solid, condensed, finely-divided or particulate silicon monoxide under oxidizing conditions at elevated temperatures below the sintering temperatures of silicon and silicon dioxide and at a rate insufficient to cause ignition and sintering, oxygen can be diffused into the interior of the silicon monoxide to provide a white product characterized by retention of essentially all of its original structure and surface area. When immersed in a solution of benzene, it completely disappears indicating that the original brown condensed silicon monoxide has been oxidized to the core of the particle so that the particle is essentially entirely silicon dioxide. Light is transmitted readily through the oxidized silicon monoxide-benzene mixture. On the other hand, an unoxidized silicon monoxide-benzene mixture is essentially opaque to light. The index of refraction of the new white product is the same as that of arc silica, $SiO_2$, in rubber so that it does not darken the original color of the rubber. The color of the rubber, thus, may vary from its natural shade up to a creamy color depending on the amount of oxidized silicon monoxide employed. If it is desired to enhance the whiteness of the rubber, a minor amount of an opaque white pigment such as $TiO_2$ may be added. It is apparent that use of the oxidized silicon monoxide of the present invention in rubbery materials will provide reinforced rubbers which can be used in many places where carbon black reinforced rubbers are used and which in contrast to carbon black rubbers will be white or light colored. Moreover, as compared to carbon black reinforced rubbers, oxidized silicon monoxide reinforced rubbers may readily be pigmented to obtain the desired color while still maintaining reinforcement.

The gases used in the furnace, retort or other heating means are oxidizing gases such as air, oxygen, carbon dioxide or steam or mixtures thereof and the like. Sufficient gas is employed to thoroughly oxidize the particles of brown silicon monoxide to white silicon dioxide.

Temperatures employed while oxidizing should be below the melting or sintering temperature of silicon or silicon dioxide to avoid sintering or coalescence of the particles. While sintering per se will produce a product exhibiting some structure, it causes a great decrease in surface area, and while in rubbery materials increased modulus is thereby obtained, it is at the expense of tensile strength so that effective reinforcement is lost. Hence, temperatures at or above the sintering point of silicon or silicon dioxide are to be avoided, and preferably, the maximum temperature utilized should not exceed 1,000° C. Moreover, lower temperatures avoid too rapid oxidation which would cause burning.

When oxidizing the particulate, condensed silicon monoxide according to the present invention, it is gradually brought up to the maximum temperature noted above. It will be understood that it is not desirable to introduce the material into the oxidizing zone at the maximum temperature as this would tend to cause rapid oxidation and consequently burning. Hence, the material is introduced into the furnace at a lower temperature for example about 500° C. and then brought slowly up to the maximum temperature and held there for a period of time sufficient to oxidize the particles to their centers or cores. After this hold period, the oxidized material is allowed to furnace cool or withdrawn from the furnace and permitted to air cool. It will be apparent that, for batches of material of varying sizes and for various oxidizing atmospheres, the heating times and temperatures can be varied considerably with obtainment of the desired results so long as the time and temperature relationships hereinbefore described are maintained.

While the above operations have been described with reference to a batch process, it is apparent that the material undergoing oxidation may be continuously treated by means of a conveyor containing buckets or boats of the material or on a belt which passes at various speeds through zones of increasing, constant and decreasing temperature until the material is thoroughly oxidized. In such operations the material is preferably in a quiescent or static state, that is, the individual particles are not agitated. However, the particles may be mechanically agitated by stirring or tumbling if care is taken to avoid too rapid oxidation or increase in temperature tending to sinter or burn the particles by exposing more surface area to action of the oxidizing gas before sufficient diffusion of oxygen into the interior of the particles has been achieved.

The following example will serve to illustrate the invention with more particularity to those skilled in the art.

*Example 1*

100 grams of substantially fibrous silicon monoxide were prepared by condensing SiO gas in an atmosphere of $N_2$ (commercial grade containing about ½% $O_2$) containing about 3% $NH_3$ under conditions essentially free of turbulence. The product obtained was essentially fibrous and brown in color. It had an average particle size of about 350 millimicrons, a ratio of width to length of about 1 to 25, an average surface area of 90 m.²/gram and a nitrogen content of about 5.5% by weight. It was placed in a porcelain boat in a furnace at a temperature of 540° C. Steam was admitted to the interior of the furnace, and after one hour, the temperature was increased to 650° C. for two hours and then was raised to 730° C. for two more hours. The temperature was finally raised to 820° C. and maintained there for 12 hours. After this hold period, the heat was removed and the oxidized material was allowed to furnace cool. The overall period of heating was 22 hours. An inspection of the resulting product revealed that it was white in color and had retained its surface area, particle size and structure. It was unsintered, and when immersed in benzene, it did not change the color of the benzene.

The finely-divided white silicon-dioxide composition of this invention is incorporated in any rubbery material capable of reinforcement with carbon blacks. Among the group of rubbery materials capable of reinforcement are natural rubber, such as caoutchouc which is essentially a conjugated polymer of isoprene, balata, gutta percha, and the like, or synthetic rubbers such as rubbery polychloroprene and rubbery polymers of the open-chain conjugated dienes having from 4 to 8 carbon atoms such as the butadiene-1,3 hydrocarbons which include butadiene-1,3, isoprene, 2,3-dimethyl butadiene-1,3, 1,4-dimethyl butadiene-1,3, and the like; or the rubbery copolymers of these and similar conjugated diolefins with each other or with such copolymerizable monomeric materials as isobutylene, styrene, acrylonitrile, methacrylonitrile, methyl acrylate, methyl methacrylate, ethyl acrylate, ethyl methacrylate, 2-vinyl pyridine, and similar materials and mixtures of these. The rubbery polymers contain at least 50% by weight of the conjugated diene and preferably from 55 to 85% by weight of the diene. Terpolymers employing at least 35% diene may also be employed. Typical rubbers in the above groups well known to the art are Buna S, GR-S, Buna N, GR-A, neoprene, Butyl and the like.

Polyacrylic synthetic rubbers can also be reinforced according to this invention. They are prepared by the polymerization of an acrylic acid ester or mixtures of acrylic acid esters in bulk or mass polymerization of the monomers or by the polymerization of the monomers in aqueous emulsions. They can also be prepared by the copolymerization of acrylic acid esters with about 5 to 10 percent by weight of a chlorine-containing monomer such as chloroethyl vinyl ether, acrylonitrile, vinyl chloride, dichloro difluoro ethylene or styrene in mass or aqueous emulsion polymerizations. Specific acrylic acid esters contemplated herein include among others methyl acrylate, ethyl acrylate, propyl acrylate, butyl acrylate, octyl acrylate, methyl methacrylate, ethyl methacrylate, butyl methacrylate, methyl ethacrylate and the like. These polyacrylic synthetic rubbers are well known to the art and can be used alone or mixed with other rubbery materials such as rubbery polychloroprene, butadiene-1,3 and styrene copolymers, natural rubber, etc. in proportions of from about 80 to 20 parts by weight of polyacrylic rubber to 20 to 80 parts by weight of diene rubber.

In reinforcing rubbery compositions according to the teachings of the present invention a minor amount of the new white finely-divided silicon-dioxide product or oxidized silicon monoxide is incorporated with a major amount of rubbery material. However, to impart optimum reinforcement to rubbery materials, it is preferable to use from 20 to 45% by weight of the white finely-divided oxidized silicon monoxide to from 80 to 55% by weight of rubbery material. While very minor amounts of the white product of this invention will impart some reinforcement to rubbery materials, satisfactory results as to elongation, modulus and tensile strength are not obtained until about 20% by weight is employed. Above about 45%, the resulting rubbery compositions become too boardy and hard to be generally useful so that this represents an upper limit.

In addition, the rubbery material may contain minor amounts of compounding ingredients such as vulcanizing agents, accelerators, antioxidants, white or color pigments and the like. Examples thereof are sulfur, zinc oxide, zinc stearate, titanium dioxide, di-dodecylamine, pine tar, phenyl beta naphthylamine, 2-mercapto benzothiazole, di-ortho tolyl guanidine, N-pentamethylene ammonium penta-methylene dithiocarbamate, etc.

The white oxidized material may be mixed readily with the rubbery material and compounding ingredients on a roll mill or in a Banbury mixer. Alternatively, it can be mixed with latex which is then coagulated and dried. The resulting rubber can then be vulcanized in a mold at temperatures of from 250 to 300° F. for various times depending on the type of cure desired.

The following examples will illustrate representative rubbery compositions containing the white reinforcing agent of the present invention.

*Example II*

Sixty parts by weight of fibrous, white, oxidized silicon monoxide having been prepared as disclosed in Example I, supra, were mixed with 100 parts by weight of natural rubber, 5 parts by weight of zinc oxide, 1 part by weight each of bis(2-benzothiazyl) disulfide, pine tar and phenyl beta naphthylamine, 1.5 parts by weight each of stearic acid and secondary coco-amine and 3 parts by weight of sulfur. Mixing was carried out until all the components were uniformly dispersed throughout the composition which was then cured at 280° F. for 60 minutes. The cured composition was light colored. When tested, it exhibited a 300% modulus of 1220, a tensile strength at break of 2720 p.s.i., and an elongation at break of 540 percent.

*Example III*

Sixty parts by weight of fibrous, white, oxidized silicon monoxide having been prepared as disclosed in Example I, supra, were mixed with 100 parts by weight of a rubbery copolymer of about 75 parts butadiene-1,3 and 25 parts styrene, 5 parts by weight of zinc oxide, 1.5 parts by weight each of stearic acid and secondary coca-amine, 1 part by weight of phenyl beta naphthylamine (Agerite), 2 parts by weight of N-cyclohexyl-2-benzothiazyl sulfenamide (Santocure), and 3.5 parts by weight of sulfur. These materials were mixed on a mill and cured at 302° F. for 60 minutes. Tests on the vulcanized compositions gave the following information: 300% modulus—1500, ultimate tensile in p.s.i.—2200, and ultimate elongation in percent—400.

While the white, finely-divided product of the present invention is particularly useful in the reinforcement of rubbery materials such as tire treads, belts and the like, it also can be used to produce hard, strong, white rubber products having excellent electrical insulation properties. Moreover, it can be employed as a white filler in sound insulating compositions and in ceramics where a finely-divided white product is required.

In summary, the present invention teaches that solid, finely-divided or particulate, brown, condensed silicon monoxide may be oxidized by careful control of oxidizing conditions to produce a light colored or white product having essentially the same surface area and structure as the original brown silicon monoxide. This new result has been achieved by oxidizing silicon monoxide for extended periods of time at temperatures well below the sintering temperature of silicon or silicon dioxide. The new white product of the present invention will enable the ready production of light to white reinforced rubbery materials on vulcanization.

Having thus described the invention what is claimed as patentably new and is desired to be secured by U.S. Letters Patent is:

1. A composition of matter comprising a major amount of rubbery polyisoprene and, as a reinforcing pigment for said polyisoprene, a minor amount of substantially fibrous, particulate, solid silicon dioxide.

2. A composition of matter comprising from 55 to 80% by weight of natural rubber to from about 45 to 20% by weight of substantially fibrous, particulate, solid, white silicon dioxide wherein the fibers have an average length of about from 50 to 600 millimicrons in which the ratio of width to length is about from 1:10 to 1:50 and a surface area of about from 60 to 200 square meters per gram.

3. An article of manufacture comprising a vulcanizate containing a major amount of rubbery polyisoprene and, as a reinforcing pigment therefor, a minor amount of substantially fibrous, particulate, solid silicon dioxide.

4. An article of manufacture comprising a vulcanizate containing from 55 to 80% by weight of natural rubber to about from 45 to 20% by weight of substantially fibrous, particulate, solid, white silicon dioxide wherein the fibers have an average particle length of from about 50 to 600 millimicrons in which the ratio of width to length is about from 1:10 to 1:50 and a surface area of about from 60 to 200 square meters per gram.

5. The method which comprises mixing a minor amount of substantially fibrous, particulate, solid silicon dioxide, as a reinforcing pigment, with a major amount of vulcanizable unvulcanized rubbery polyisoprene and vulcanizing the resulting mixture.

6. The method which comprises mixing together from about 45 to 20% by weight of substantially fibrous, particulate, solid, white silicon dioxide wherein the fibers have an average length of from about 50 to 600 millimicrons in which the ratio of width to length is about from 1:10 to 1:50 and a surface area of about from 60 to 200 square meters per gram with from 55 to 80% by weight of vulcanizable unvulcanized natural rubber and vulcanizing said mixture.

References Cited in the file of this patent

UNITED STATES PATENTS

| | | |
|---|---|---|
| 886,636 | Potter | May 5, 1908 |
| 908,131 | Potter | Dec. 29, 1908 |
| 2,428,252 | Von Stroh | Sept. 30, 1947 |
| 2,502,949 | Howlett et al. | Apr. 4, 1950 |
| 2,560,043 | Schmidt | July 10, 1951 |
| 2,692,869 | Pechukas | Oct. 26, 1954 |